(12) United States Patent
Groll et al.

(10) Patent No.: US 9,144,349 B2
(45) Date of Patent: Sep. 29, 2015

(54) MAGNETIC POT RACK

(75) Inventors: William A. Groll, McMurray, PA (US); Troy Schuler, McMurray, PA (US)

(73) Assignee: ALL-CLAD METALCRAFTERS LLC, Canonsburg, PA (US)

( * ) Notice: Subject to any disclaimer, the term of this patent is extended or adjusted under 35 U.S.C. 154(b) by 1076 days.

(21) Appl. No.: 12/132,883

(22) Filed: Jun. 4, 2008

(65) Prior Publication Data

US 2008/0302745 A1    Dec. 11, 2008

Related U.S. Application Data

(60) Provisional application No. 60/933,168, filed on Jun. 5, 2007.

(51) Int. Cl.
    A47F 5/08    (2006.01)
    A47J 45/02   (2006.01)
    A47F 5/00    (2006.01)

(52) U.S. Cl.
    CPC .......... *A47J 45/02* (2013.01); *A47F 2005/0012* (2013.01)

(58) Field of Classification Search
    CPC .................. A47J 45/02; A47F 2005/0012
    USPC ................. 211/113, 41.11, 117, DIG. 1, 118; 248/206.5, 309.4, 322, 339, 340, 683, 248/537
    See application file for complete search history.

(56) References Cited

U.S. PATENT DOCUMENTS

| | | | | |
|---|---|---|---|---|
| 627,387 A | * | 6/1899 | Brown | 37/444 |
| 1,613,447 A | * | 1/1927 | Ellberg | 211/123 |
| 1,787,587 A | * | 1/1931 | Miller | 211/41.1 |
| 2,580,961 A | * | 1/1952 | Schmedinghoff | 211/119.003 |
| 3,469,710 A | * | 9/1969 | Vosbikian | 211/116 |
| 3,664,512 A | * | 5/1972 | Smith | 211/113 |
| 3,672,324 A | * | 6/1972 | Schnedler | 118/63 |
| 3,706,059 A | * | 12/1972 | Theyse | 335/302 |
| 3,998,332 A | | 12/1976 | Lambertson | |
| 4,097,359 A | * | 6/1978 | Davitz | 204/297.06 |
| 4,282,630 A | * | 8/1981 | Toder | 16/93 D |
| 4,290,531 A | * | 9/1981 | Lazarus, III | 211/85.29 |
| 4,314,646 A | * | 2/1982 | Purnell | 211/113 |
| 4,325,486 A | * | 4/1982 | Neal | 211/85.29 |
| 4,586,616 A | * | 5/1986 | Cooper et al. | 211/88.04 |
| 4,714,166 A | | 12/1987 | Hann et al. | |

(Continued)

FOREIGN PATENT DOCUMENTS

JP    2010240034 A  * 10/2010

*Primary Examiner* — Jonathan Liu
*Assistant Examiner* — Devin Barnett
(74) *Attorney, Agent, or Firm* — The Webb Law Firm

(57) ABSTRACT

A pot rack comprising at least one track member having spaced-apart rails with at least an upper rail surface having a ferromagnetic property and at least one hook member having a lower hook portion for releasably engaging a kitchen utensil, and an upper cap portion of a dimension greater than a spacing between the rails wherein the cap portion includes a magnetic member which is magnetically attracted to the upper rail surface of each of the rails and a shank portion interconnecting the upper cap portion and the lower hook portion. A hook member for use on a slotted ferromagnetic rail comprising a head portion, an integral shank portion and a hook portion extending from the shank portion, said head portion having magnetic means associated therewith to establish a magnetic attraction between the head portion and the rail.

2 Claims, 9 Drawing Sheets

(56) References Cited

U.S. PATENT DOCUMENTS

| | | | |
|---|---|---|---|
| 4,953,714 A * | 9/1990 | Paul | 211/36 |
| 5,137,158 A * | 8/1992 | Brockway | 211/106.01 |
| D353,502 S | 12/1994 | Liu | |
| 5,577,696 A * | 11/1996 | Kramer | 248/206.5 |
| D391,796 S * | 3/1998 | Chen | D6/574 |
| D392,130 S * | 3/1998 | Wangler | D6/705 |
| D392,133 S * | 3/1998 | Chen | D6/513 |
| 5,746,329 A * | 5/1998 | Rondeau | 211/123 |
| D408,666 S * | 4/1999 | Sorensen et al. | D6/513 |
| 5,908,120 A * | 6/1999 | Yates et al. | 211/119 |
| 6,218,949 B1 * | 4/2001 | Issachar | 340/624 |
| 6,227,387 B1 * | 5/2001 | Rose | 211/85.29 |
| D449,977 S * | 11/2001 | Dembowiak et al. | D8/367 |
| D455,922 S * | 4/2002 | Rafoth et al. | D6/513 |
| 6,454,147 B1 * | 9/2002 | Marks | 224/268 |
| 6,491,271 B1 * | 12/2002 | Adams | 248/206.5 |
| D468,942 S * | 1/2003 | Rafoth et al. | D6/513 |
| D469,286 S * | 1/2003 | Rafoth et al. | D6/513 |
| 6,672,359 B2 * | 1/2004 | Morris | 160/38 |
| D499,284 S * | 12/2004 | Rafoth et al. | D6/513 |
| D504,585 S * | 5/2005 | Rafoth et al. | D6/513 |
| D504,586 S * | 5/2005 | Rafoth et al. | D6/513 |
| D505,286 S * | 5/2005 | Rafoth et al. | D6/513 |
| D568,725 S * | 5/2008 | Snider | D8/372 |
| 7,448,582 B2 * | 11/2008 | Jackson | 248/215 |
| 8,371,546 B2 * | 2/2013 | Bauerly | 248/304 |
| 2006/0124811 A1 * | 6/2006 | Tatarsky et al. | 248/220.31 |
| 2007/0024405 A1 * | 2/2007 | Terasaki | 335/302 |
| 2007/0095768 A1 * | 5/2007 | Huo | 211/113 |
| 2009/0108164 A1 * | 4/2009 | Washio et al. | 248/339 |
| 2009/0173703 A1 * | 7/2009 | Einbinder et al. | 211/41.11 |
| 2009/0272704 A1 * | 11/2009 | Wu | 211/113 |
| 2012/0280098 A1 * | 11/2012 | Rinck | 248/304 |
| 2013/0037678 A1 * | 2/2013 | Liu | 248/339 |
| 2013/0306823 A1 * | 11/2013 | Liu | 248/339 |
| 2014/0326844 A1 * | 11/2014 | Sullivan | 248/339 |

* cited by examiner

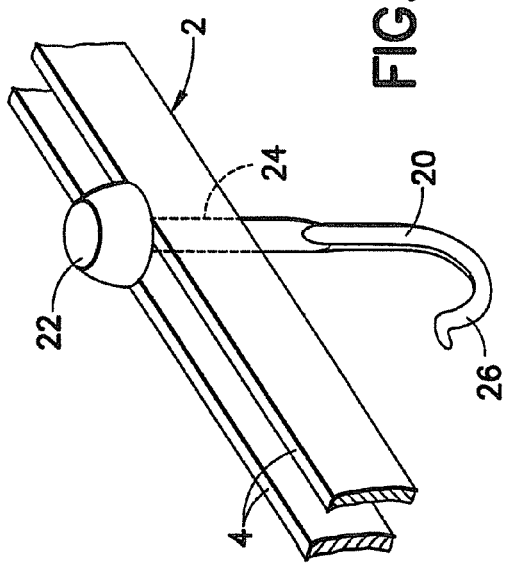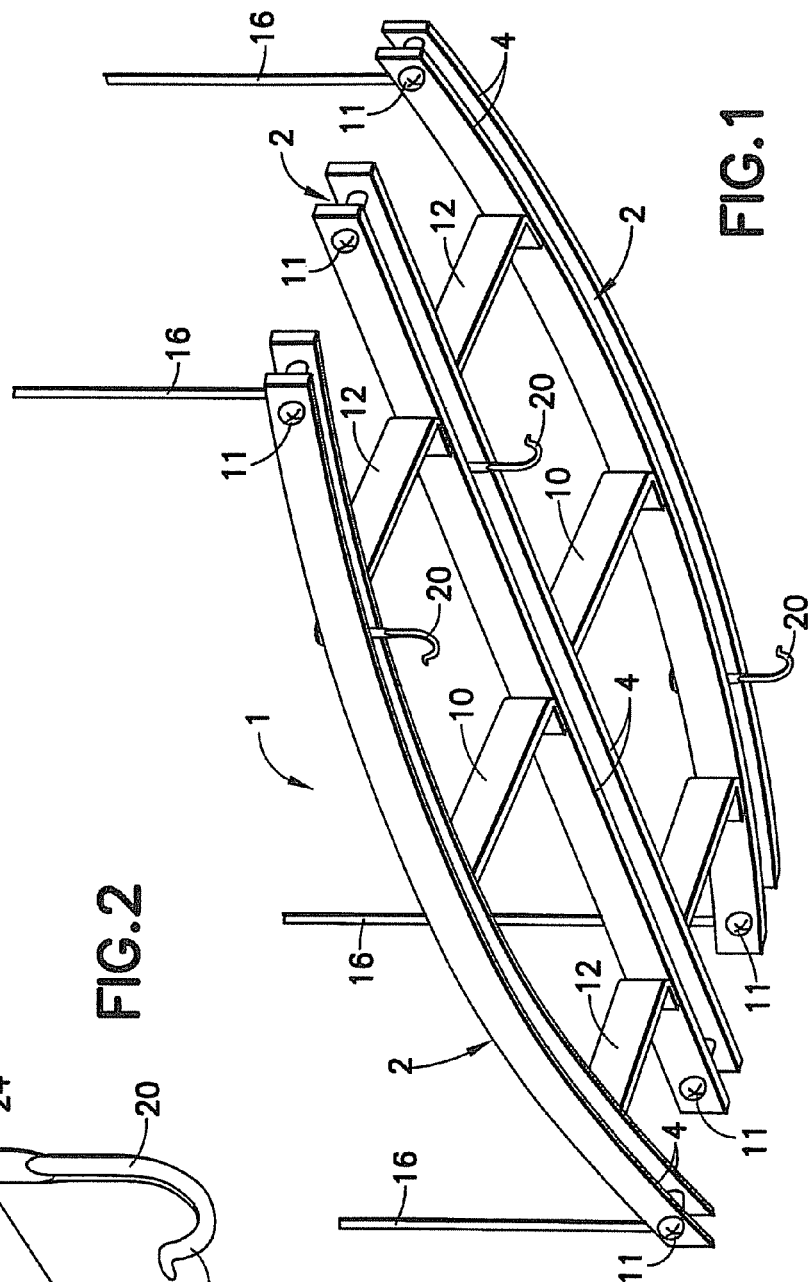

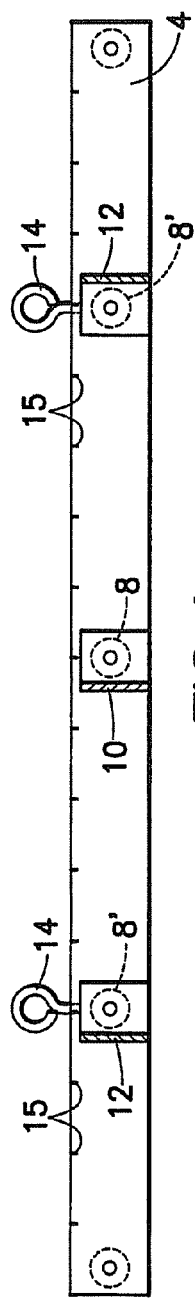
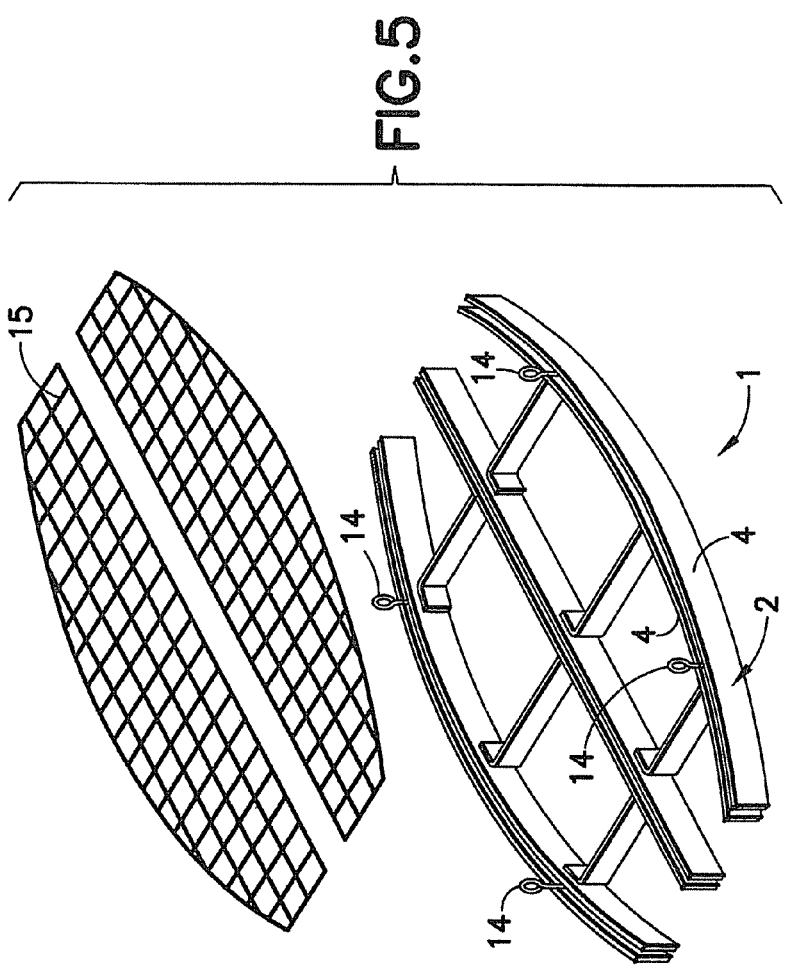

MAGNETIC POT RACK

BACKGROUND OF THE INVENTION

1. Field of the Invention

The invention relates generally to hanger systems and, more particularly, to a hanger system for hanging pots, pans and like cookware and kitchen utensils from a ceiling or wall mounted hanger support system.

2. Description of Related Art

U.S. Design Pat. Nos. Des. 392,133 and Des. 391,796 to Chen disclose a round ceiling rack and a half-round wall rack, respectively, which include spaced-apart rails. Hook members, having a head portion and a hook portion joined together by a flat shank portion, appear to be slidably positioned in the slots between the spaced-apart rails. The flat shanks of the hooks engage the rails on opposed sides so as to prevent rotation of the hook members.

U.S. Design Pat. No. Des. 353,502 to Liu discloses a hanger for kitchen utensils having a single square beam open at its lower surface to permit a plurality of hanger hooks to slide therein.

U.S. Pat. No. 4,714,166 to Hann et al. discloses a supporting rack for cooking utensils comprising a generally rectangularly formed flat bar with hook members suspended therearound.

Additional prior art pot racks and hanger systems are disclosed in U.S. Pat. No. 6,227,387 to Rose; U.S. Pat. No. 5,960,967 to Neil; U.S. Pat. No. 4,290,531 to Lazarus, III; and U.S. Pat. No. 3,998,332 to Lambertson.

One major drawback in conventional pot rack systems resides in the area where the hook attaches to the metal rack. Conventional pot hangers sometimes include hooks at both ends which will result in relative movement between adjacent pots and pans, generating contact between the hanging utensils, causing annoying sounds and possible cosmetic damage to the cookware. Other track-mounted hooks tend to move or "walk" along the rails when the rack is vibrated as other pots and pans are being removed or replaced. Hook systems such as disclosed in the above-mentioned Chen patents also suffer from the drawback that the hook cannot be rotated to accommodate better positioning of the utensils being hung.

The present invention solves the shortcomings found in the prior art by providing a pot rack system having a unique hook and track arrangement which provides easy movement along the rack including 360° rotation of the hook. Once the desired position is found, the hook remains firmly in place on the rack.

SUMMARY OF THE INVENTION

Briefly stated, the pot rack of the present invention comprises at least one track member having spaced-apart rails with at least an upper rail surface having a ferromagnetic property, and at least one hook member having a lower hook for releasably engaging a kitchen utensil, and an upper cap portion of a dimension greater than a spacing between the rails. The cap portion of the hook member includes a magnetic portion which is magnetically attracted to the upper rail surface of each of the rails. A shank portion of the hook interconnects the upper cap portion and the lower hook portion.

BRIEF DESCRIPTION OF THE DRAWINGS

FIG. 1 is a perspective view of a presently preferred embodiment of the pot rack system of the present invention;

FIG. 2 is an enlarged, fragmented perspective view of a portion of the pot rack system of FIG. 1;

FIG. 4 is a side elevation sectional view of the pot rack taken along line IV-IV of FIG. 3;

FIG. 5 is an exploded perspective view of the pot rack and screen deck of the present invention;

DETAILED DESCRIPTION OF THE INVENTION

Figure 3:
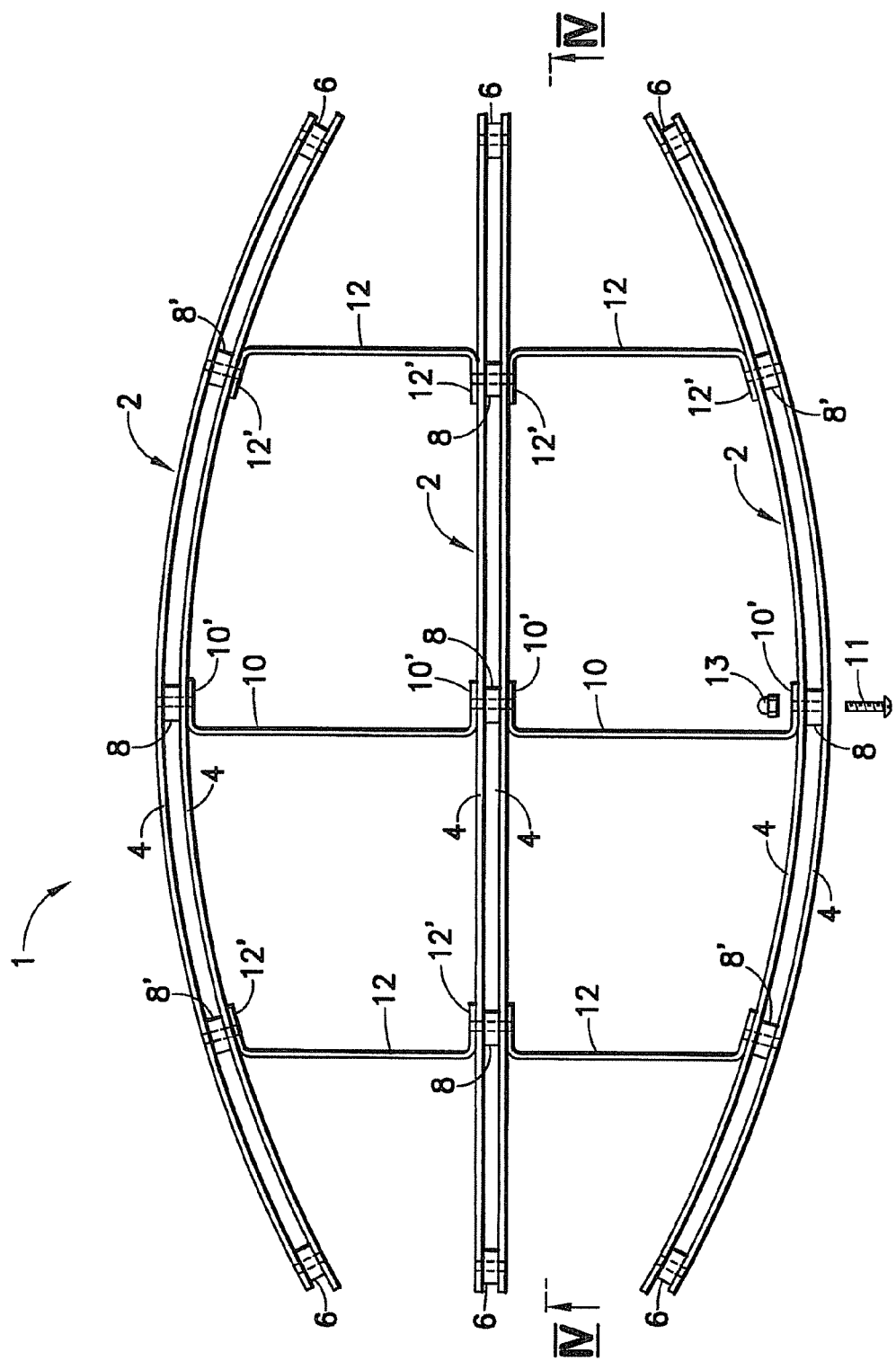
FIG. 3 is a plan view of a presently preferred embodiment of the pot rack track configuration of the present invention.
Figure 6:
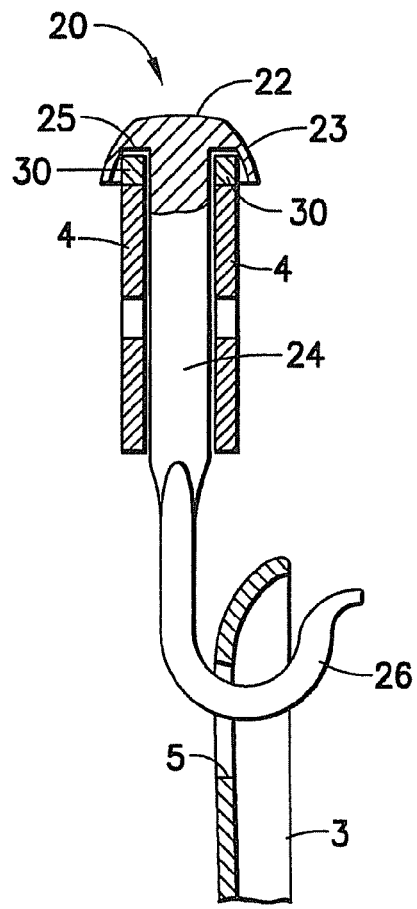
FIG. 6 is a cross-sectional side elevation view of a hook member positioned between two rails in accordance with the present invention.
Figure 7:
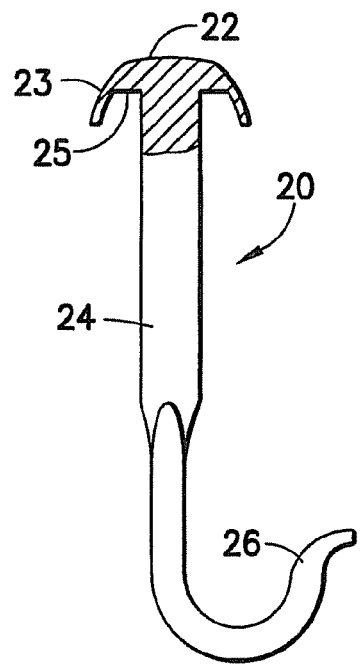
FIGS. 7 and 7(a) are cross-sectional views similar to FIG. 6 showing the hook member.
Figure 7A:
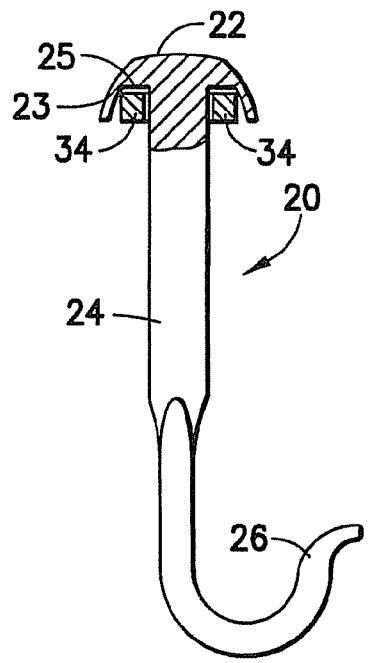

One presently preferred embodiment of the pot rack 1 of the present invention is depicted in FIGS. 3 and 5 of the attached drawings. The pot rack 1 comprises at least one track member 2 for slidably retaining hook members 20 therealong for hanging pots, pans and like kitchen utensils. As shown in FIG. 6, a typical cookware handle 3 has a conventional hole 5 formed at one end thereof through which the hook portion 26 of the hook member 20 extends for suspending the pot or like utensil from the pot rack 1.

As shown in FIGS. 1, 2, 3 and 5, the track members 2 are formed by two spaced-apart rails 4. The rails 4 are made from a ferromagnetic material such as carbon steel or a ferritic grade of stainless steel and are spaced apart about one-half inch. In this embodiment, each rail 4 is about 0.188 inch thick and about 2 inches wide. The length of the rails 4 is made to satisfy the particular installation; however, a length of about 34½ inches is presently preferred to fit most use environments. Spacing between the rails 4 is accomplished by a pair of spacers 6 located at the respective ends of the track members between the spaced-apart rails 4. Spacers 8 are employed at the center and spacers 8' may be used on the outermost rails or track members 2 to support hanger eye bolts 14 as shown in FIGS. 4 and 5. A bolt 11 and nut 13 extend through the spacers 8 and 8' to secure the spacers and the rails 4 together. The hanger eye bolts 14 have a threaded end which may be secured within threaded holes formed in the spacers 8'.

In the presently preferred embodiment shown in the drawings, the track members 2 and the rails 4 forming the track members have an outermost bowed or curved shape with an inner straight track member. The track members 2 are held together by a plurality of short cross braces 12 and long cross braces 10 at the center of the pot rack. The braces carry end flanges 12' and 10' which are attached by way of the bolts 11 and nuts 13 through their respective spacers 8 and 8'.

The pot rack may also contain a grid 15 shown in FIG. 4 and FIG. 5 in two half sections which rests on the upper edges of the cross braces 10 and 12 below the upper edges of the track members 2, see FIG. 4. The grid 15 may be formed of steel material and functions to support loose items such as utensil lids and the like. The grid 15 may also serve as additional means for hanging conventional hooks in addition to the hooks 20 which are positioned within the rails 4 of the track members to provide additional hanging capacity.

Figure 8:
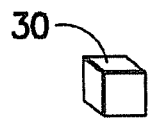
FIGS. 8, 9 and 9(a) are perspective views of a cube-shaped magnet and a cylindrical magnet and a donut magnet, respectively, suitable for use in the present invention.
Figure 9:
Figure 9A:
Figure 10:
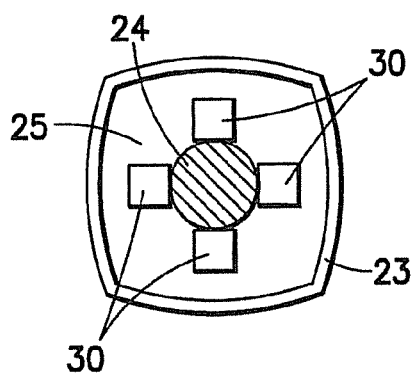
FIGS. 10, 10(a) and 11 are bottom plan views of the head of the hook member showing placement of the magnets.
Figure 10A:
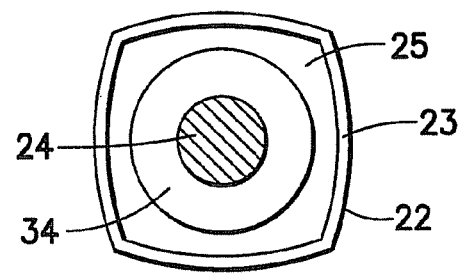
Figure 11:
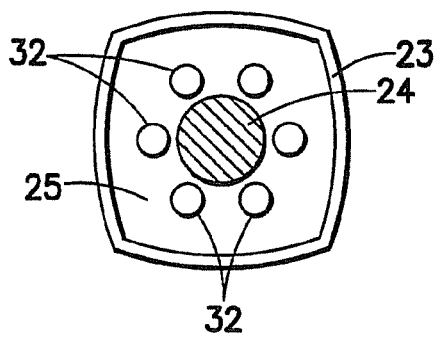
Figure 12:
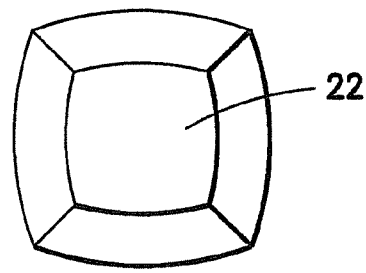
FIG. 12 is a plan view of a decorative head portion of the hook member.
Figure 13:
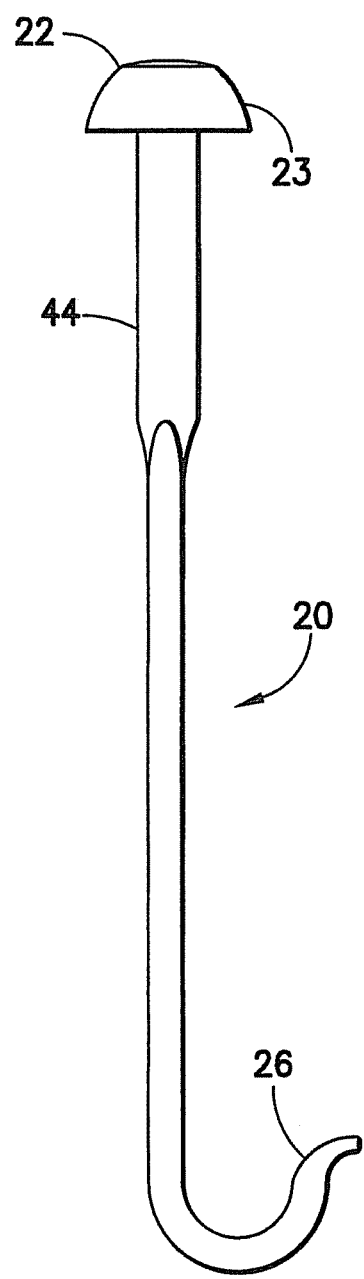
FIG. 13 is a side elevation view of a long version of the hook member.

The hook member 20 comprises a head portion 22 connected to a shank portion 24 and an integral hook portion 26. The shank portion 24 preferably has a cylindrical shape of a diameter slightly smaller than the spacing between the rails 4 to permit the hook to rotate freely once it is inserted downwardly into the opening between the rails, see FIGS. 2 and 6, for example. The hook member 20 includes a plurality of magnets 30, 32 or 34 positioned beneath the head portion 22 to engage the upper edges of the rails 4. In order to accommodate the magnets, the head portion 22 may include an overhanging skirt 23 which defines an annular region 25 under the head portion 22. Magnets, respectively as shown in FIGS. 8, 9 and 9(a) are formed in the shape of cubes 30 or cylinders 32 or as a donut 34, also shown in FIGS. 7(a), 10, 10(a) and 11. The magnets are adhesively secured within the annular region 25 beneath the head portion 22 of the hooks 20. The annular region 25 forms a cavity of about 0.25 inch deep for holding the magnets. The magnets may be made from sintered neodymium-iron boron material to provide long life and sufficient magnetic attraction with the ferromagnetic material of the rails 4. In use, the magnets are hidden from view by virtue of the overhanging skirt 23 of the head portion 22.

The rails 4 of the track members preferably are made from chrome-plated carbon steel to provide an attractive high mirror polished finish. The hooks 20 are preferably made from a cast aluminum likewise given a high mirror polished finish. The head portion 22 as shown in FIG. 2 may be given a decorative shape and embossed with the manufacturer's logo. The shank portion 24 of the hooks 20 in the embodiment shown have a cylindrical shape about 0.45 inch in diameter to provide smooth fitting inside the 0.5 inch space between adjacent rails 4 such that the hook can be rotated within the rails.

In use, the hooks are inserted in the slot portions between adjacent rails 4 by placing the hook portion 26 downwardly through the rails with the hook end 26 aligned with the longitudinal axis of the rails and then lowered until the head portion 22 comes to rest at the top edges of the rails 4. The magnets 30, 32 or 34 have sufficient magnetic attraction with the ferromagnetic material of the rails 4 to firmly grip the rails but not sufficiently strong to interfere with hand movement of the hooks for slidable adjustment along the rails to any location desired by the user. The hooks, as stated above, are also rotatable within the slots between the rails 4 to permit further adjustment of a pot or pan hooked thereto. Once in place, the magnetic attraction causes the hooks to remain securely in the rail slot.

Steel cables or chains 16 or the like are secured to the hanger eye bolts or like attachment hardware and are secured by conventional means to the structure such as a ceiling positioned above from which the pot rack 1 is suspended.

Figure 14:
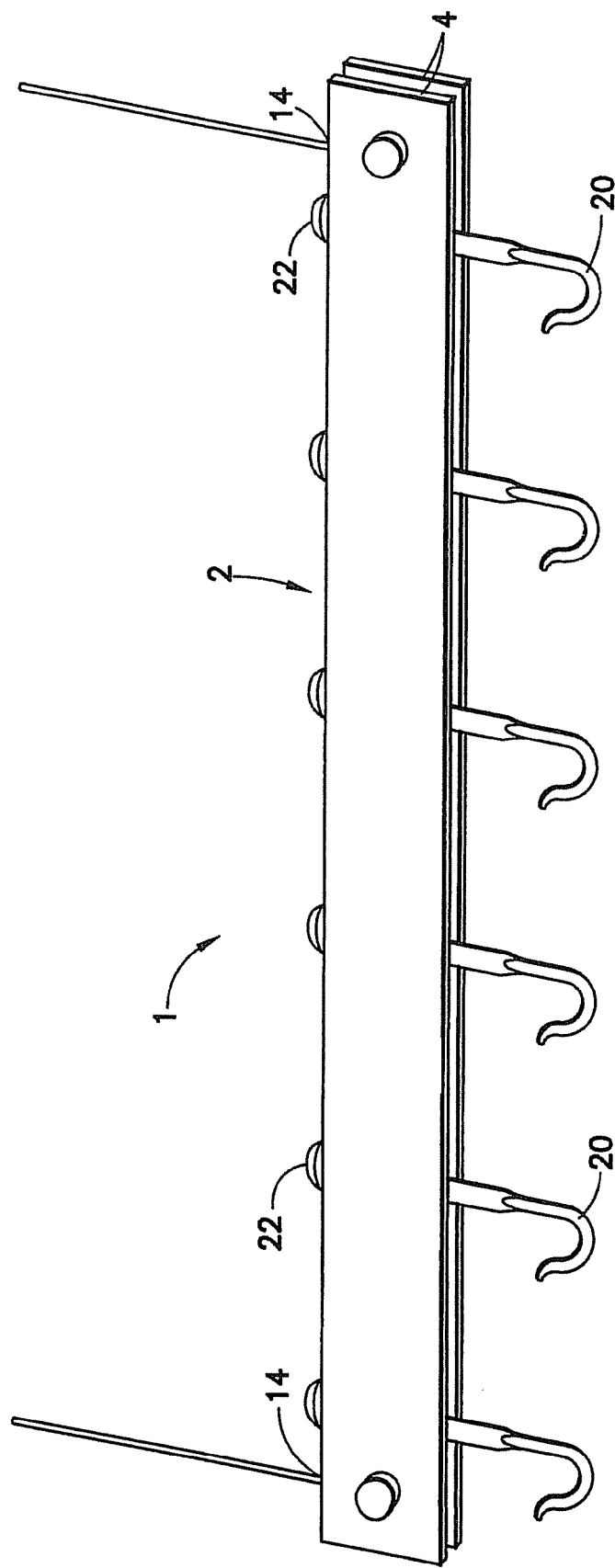
FIG. 14 is a perspective view of a single track pot rack of the invention.

If desired, in an alternate form of the invention, the pot rack 1 in the configuration of a single track member 2 could be employed in the form of central track member 2 shown in FIG. 14. In such a modification, the eye bolt hangers (not shown) could be positioned adjacent to the ends 14 of the track member in a location similar to that shown in FIG. 4.

Figure 15:
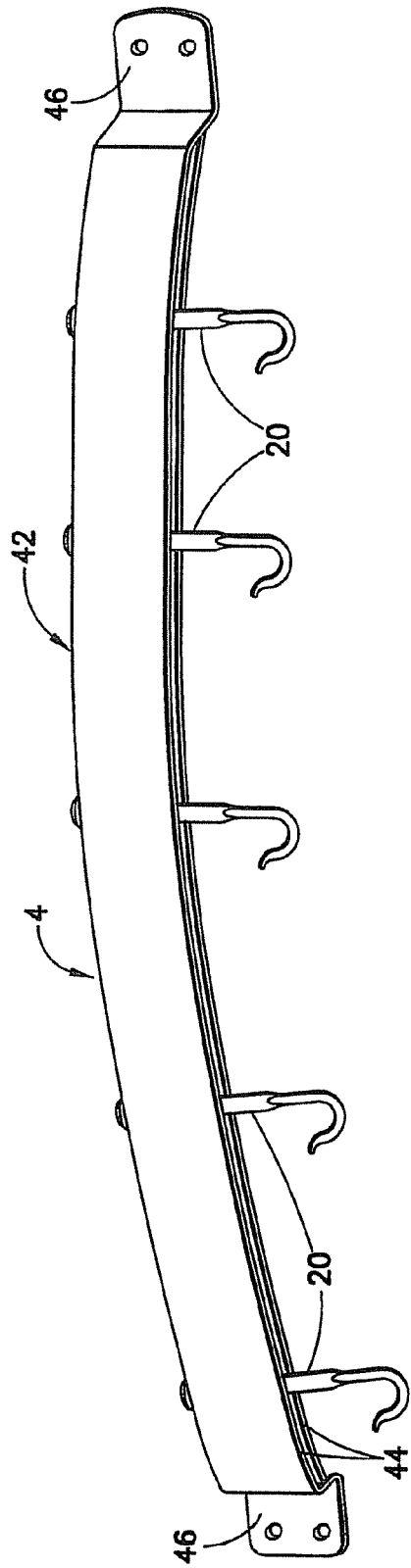
FIG. 15 is a perspective view of a wall mounted pot rack of the present invention.
Figure 16:
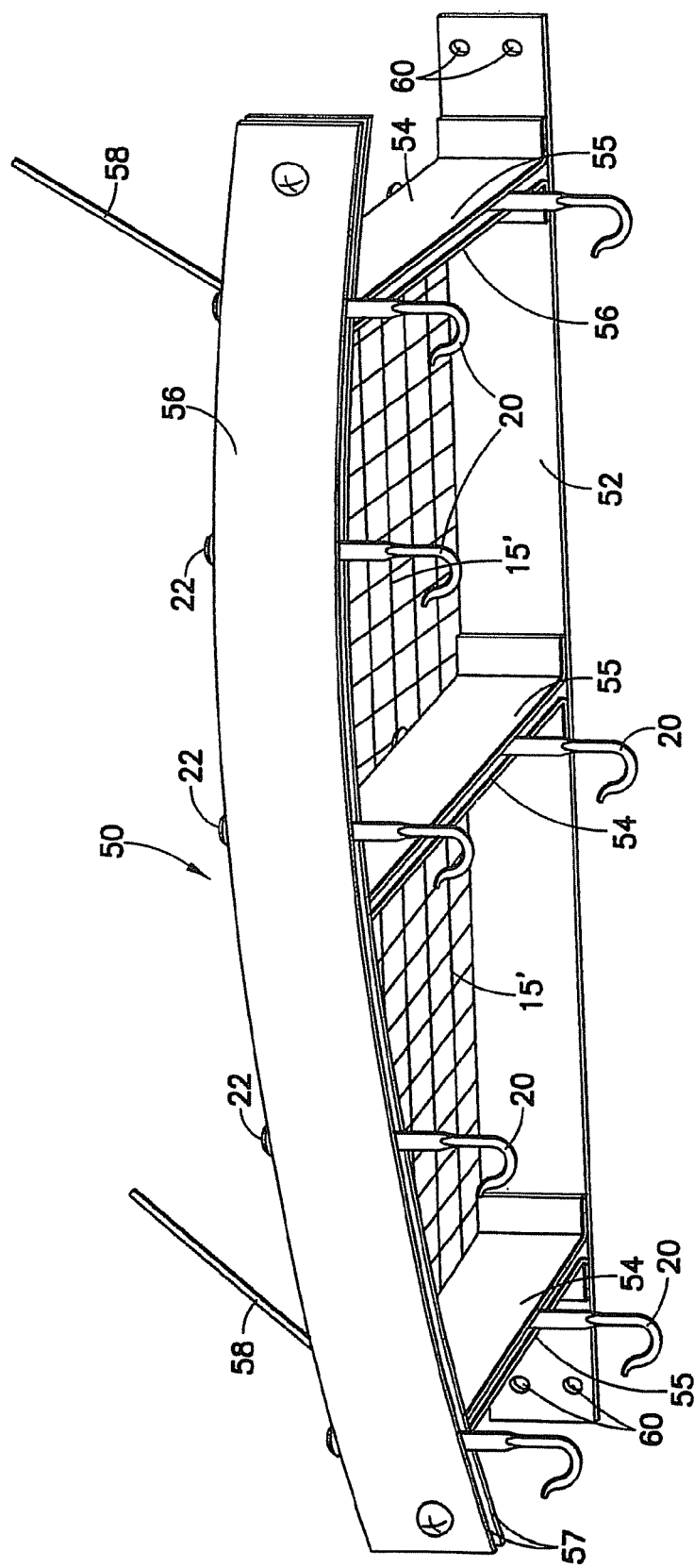
FIG. 16 is a perspective view of a further wall mounted embodiment of the invention.

The magnetic pot rack of the invention may be further modified in accordance with the wall mounted embodiments depicted in FIGS. 15 and 16. The wall mounted pot rack 40 of the invention shown in FIG. 156 comprises a single track 42 formed by a pair of spaced-apart rails 44. The track 42 and rails 44 are in a curved, bow shape having right angled mounting brackets 46 attached at each end for bolting to a vertical wall. Previously described magnetic hooks 20 are provided in the slots between the rails 44 of the curved track 42.

Another wall mounted pot rack embodiment 50 is depicted in FIG. 16. In embodiment 50, a flat wall mounted bar 52 has three inner track members 54 comprising spaced-apart rails 55 attached thereto in a perpendicular manner. A curved or bow-shaped outer track member 56 is attached to the ends of the inner track members 54. The outer track member 56 comprises spaced-apart rails 57 with slots defined between the rails as previously described.

Previously described hooks 20 with the magnetic head portions 22 are positioned with the rail slots between the rails 55 and rails 57 of the respective tracks 54 and 56 for hanging pots, pans and the like. A pair of cables 58 are preferably attached at each end of the outer track member 56 for attachment to the wall above attachment areas 60 of the wall mounted bar 52 to further support the weight of the rack and kitchen utensils hanging thereon. This is particularly important in a cantilever wall mount arrangement shown in FIG. 16.

The wall mounted pot rack 50 may also have a grid 15' supported on the upper surface thereof, if desired, for placement of lids and the like, as previously described. In positioning and mounting of the grid 15', care must be taken to avoid interference between the bars of the grid and the magnetic head portions 22 of the hooks 20 positioned within the inner track members 54 so as to permit placement of the hooks in the slots of the track members.

The invention claimed is:

1. A pot rack comprising:
   at least one track member comprising a pair of spaced-apart rails with upper rail surfaces having a ferromagnetic property, said upper rail surfaces lying in a common horizontal plane; and
   at least one hook member having a lower hook portion for releasably engaging a kitchen utensil, and an upper head portion of a dimension greater than a spacing between the rails wherein the upper head portion includes a magnetic member positioned beneath the head portion which is magnetically attracted to the upper rail surface of each of the spaced-apart rails and a vertically extending shank portion integrally interconnecting the upper head portion and the lower hook portion, said shank portion having a diameter smaller than a spacing between the rails to permit integral rotation of the head portion, shank portion, and hook portion in the track member, and wherein the magnetic member is a continuous, annular magnet having a rail contacting surface positioned beneath the head portion and co-planar with the common horizontal plane of the upper rail surfaces to magnetically contact the pair of spaced-apart upper rail surfaces, said rail contacting surface of the annular magnet being substantially perpendicular to and circumscribing the vertically extending integral shank portion of the hook member to permit longitudinal movement of the hook member along the track and rotational movement of the head portion, shank portion and hook portion about a vertical axis of the shank portion within the track for adjustment of a hanging orientation of the kitchen utensils hooked thereto, whereby the annular magnet causes the hook member to remain securely in the rails to maintain the kitchen utensil in a desired alignment without longitudinal or rotative movement thereof.

2. A hook member for use on a slotted ferromagnetic track, having horizontally extending, spaced-apart upper rail surfaces lying in a common horizontal plane, said hook member comprising a head portion, an integral shank portion and a hook portion extending from the shank portion, said head portion having magnetic means associated therewith adapted to establish a magnetic attraction between the head portion and the upper rail surfaces, wherein the integral shank portion has a diameter smaller than a spacing between the rails to permit integral rotation of the head portion, shank portion, and hook portion in the track about a vertical axis of the shank portion, and wherein the magnetic means is a continuous, annular magnet having a rail contacting surface positioned beneath the head portion, substantially perpendicular to and circumscribing the shank portion.

* * * * *